(12) United States Patent
Chai (10) Patent No.: US 11,053,415 B2
(45) Date of Patent: Jul. 6, 2021

(54) PRESSURE-SENSITIVE ADHESIVE TAPE (71) Applicants: NITTO DENKO MATERIALS (MALAYSIA) SDN. BHD., Selangor (MY); NITTO DENKO CORPORATION, Ibaraki (JP)

(72) Inventor: Lee Lee Chai, Selangor (MY)

(73) Assignees: NITTO DENKO MATERIALS (MALAYSIA) SDN. BHD., Selangor (MY); NITTO DENKO CORPORATION, Ibaraki (JP)

( * ) Notice: Subject to any disclaimer, the term of this patent is extended or adjusted under 35 U.S.C. 154(b) by 176 days.

(21) Appl. No.: 16/254,953

(22) Filed: Jan. 23, 2019

(65) Prior Publication Data
US 2019/0225841 A1 Jul. 25, 2019

(30) Foreign Application Priority Data

Jan. 24, 2018 (MY) .............................. PI2018700312
Jan. 18, 2019 (MY) .............................. PI2019000146

(51) Int. Cl.
C09J 7/38 (2018.01)
C09J 7/21 (2018.01)
C09J 7/20 (2018.01)

(52) U.S. Cl.
CPC .............. *C09J 7/385* (2018.01); *C09J 7/205* (2018.01); *C09J 7/21* (2018.01); *C09J 7/383* (2018.01); *C09J 2301/124* (2020.08); *C09J 2301/302* (2020.08); *C09J 2301/312* (2020.08); *C09J 2400/283* (2013.01); *C09J 2407/006* (2013.01); *C09J 2421/00* (2013.01); *C09J 2423/003* (2013.01); *C09J 2433/00* (2013.01); *C09J 2433/003* (2013.01)

(58) Field of Classification Search
None
See application file for complete search history.

(56) References Cited

U.S. PATENT DOCUMENTS

| | | | | |
|---|---|---|---|---|
| 1,760,820 A | | 5/1930 | Drew | |
| 4,202,925 A | * | 5/1980 | Dabroski | ................ A61L 15/58 |
| | | | | 428/219 |
| 5,613,942 A | * | 3/1997 | Lucast | .................... A61L 15/58 |
| | | | | 602/52 |
| 6,441,092 B1 | * | 8/2002 | Gieselman | ............. C09J 133/08 |
| | | | | 525/191 |
| 7,312,265 B2 | * | 12/2007 | Wada | ..................... C09J 133/04 |
| | | | | 524/272 |
| 2004/0221939 A1 | * | 11/2004 | Hiramatsu | ............ B41F 35/003 |
| | | | | 156/66 |
| 2005/0153110 A1 | * | 7/2005 | Juby | ..................... B32B 37/153 |
| | | | | 428/195.1 |
| 2008/0214079 A1 | * | 9/2008 | Harai | ........................ C09J 7/38 |
| | | | | 442/151 |

(Continued)

*Primary Examiner* — Scott R. Walshon
(74) *Attorney, Agent, or Firm* — United IP Counselors, LLC (57) ABSTRACT

A pressure-sensitive adhesive tape comprises a backing layer having a first and a second surface; and a first pressure-sensitive adhesive layer affixed to the first surface; wherein the first pressure-sensitive adhesive layer has an adhesive strength of 2.0 N/10 mm to 9.0 N/10 mm in absence of a solvent and the pressure-sensitive adhesive tape has a tensile strength in longitudinal direction of 45 N/15 mm to 80 N/15 mm.

28 Claims, 2 Drawing Sheets

(56) References Cited

U.S. PATENT DOCUMENTS

2011/0045286 A1* 2/2011 Watanabe ............ C09J 133/08
  428/343
2016/0326401 A1* 11/2016 Ikebata .................. C09J 7/255

* cited by examiner

PRESSURE-SENSITIVE ADHESIVE TAPE

CROSS-REFERENCE TO RELATED APPLICATIONS

This application claims priority to Malaysian Patent Application No. PI 2018700312, filed Jan. 24, 2018, and to Malaysian Patent Application No. PI 2019000146, filed on Jan. 18, 2019. Both of those applications are incorporated by reference in their entireties.

FIELD OF INVENTION

The invention relates to the field of adhesive, particularly a pressure-sensitive adhesive tape.

BACKGROUND OF THE INVENTION

Adhesive is a helpful tool that people have been using for bonding and holding substrates together. People in the earlier centuries used adhesives derived from animals and plants for bonding and laminating. In 1750, England issued the very first patent for an adhesive, particularly a fish-based glue. Adhesives are very useful for holding materials together. Yet, they can also be troublesome to use, especially in household use. For instance, glues can cause messiness during application and might take a long time to dry. Besides, they usually create a permanent bond with the substrate and might be difficult to be removed from the substrate that they bond.

An adhesive tape is a type of removable adhesive and typically contains a backing material coated with an adhesive. It was first introduced by a surgeon named Dr. Horace Day in 1845. The adhesive tape was called Surgical Tape and included a strip of fabric with a rubber adhesive applied thereon. The development of adhesive tapes progressed further in the 20$^{th}$ century. For example, Johnson and Johnson developed an improved version of the Surgical Tape called Band-Aid in 1921 and the Duct Tape in 1942. The first masking tape was invented by Richard Drew from 3M company in 1925. A U.S. Pat. No. 1,760,820 was issued for his invention in relation to a removable adhesive tape comprising a creped paper backing and a pressure-sensitive adhesive coating on one face of the adhesive tape in 1930.

There are several types of adhesive tapes available in the market, including pressure-sensitive adhesive tape, water-activated tape, heat-sensitive tape, and drywall tape. In more particular, a pressure-sensitive adhesive tape is an adhesive tapes having pressure-sensitive adhesive coated onto the backing material. Pressure-sensitive adhesive tape is sticky under room conditions and can be adhered to a substrate with light pressure and without any heat or solvent for activation.

Pressure-sensitive adhesive tapes are generally easy to use, yet there are many possibilities of failure when using pressure-sensitive adhesive tapes. One possible failure of the pressure-sensitive adhesive tape is the reduction of adhesive strength upon contact with contaminants found on the surface of the substrate. Any grease, oil or other impurities on the surface can potentially cause loss of adhesion of the adhesive tape. Another possible failure of the pressure-sensitive adhesive tape is the presence of adhesive residues on the substrate surface when the adhesive tape is removed from the surface. Removal of adhesive residues left on the substrate surface can be difficult and might cause damage to the substrate surface.

In the golf equipment industry, lubricants are widely used to facilitate the inserting of tight-fitting golf grip onto the golf club shaft that is pre-applied with a pressure-sensitive adhesive tape. The lubricant often causes the pressure-sensitive adhesive tape to experience loss of adhesion, allowing the golf grip to be fitted on the golf club shaft easily. The lubricant on the pressure-sensitive adhesive tape prevents effective bonding between the golf grip and the golf club shaft until it dries up. The golf grip might glide around or along the golf club shaft when the lubricant has not dried up and the adhesive tape fails to hold it in position on the shaft. Furthermore, adhesive residue left on the golf club shaft after removal of the adhesive tape will prolong the process of replacing the golf grip as more time is needed to clean the adhesive residue before new adhesive tape can be applied on the shaft.

SUMMARY OF INVENTION

The primary object of the invention is to provide a pressure-sensitive adhesive tape with adhesive strength that is relatively stable even when it is exposed to a solvent.

Another object of the invention is to provide a pressure-sensitive adhesive tape that leaves no or minimal amount residue on an adherend upon peeling.

Further another object of the invention is to provide a pressure-sensitive adhesive tape with a relatively high adhesive strength yet is easy to be peeled from an adherend without delamination of the tape structure.

Still another object of the invention is to provide a pressure-sensitive adhesive tape that does not break easily when it is being peeled off from an adherend.

At least one of the preceding objects is met, in whole or in part, by the present invention, in which the embodiment of the present invention describes a pressure-sensitive adhesive tape comprising a backing layer having a first and a second surface and a first pressure-sensitive adhesive layer affixed to the first surface of the backing layer, wherein the first pressure-sensitive adhesive layer has an adhesive strength of 2.0 N/10 mm to 9.0 N/10 mm in absence of a solvent and the pressure-sensitive adhesive tape has a tensile strength in longitudinal direction of 45 N/15 mm to 80 N/15 mm.

In one embodiment, the pressure-sensitive adhesive tape further comprises a primer layer sandwiched between the backing layer and the first pressure-sensitive adhesive layer.

In one embodiment, the pressure-sensitive adhesive tape further comprises a second pressure-sensitive adhesive layer affixed to the second surface of the backing layer.

In one embodiment, the pressure-sensitive adhesive tape further comprises a primer layer sandwiched between the backing layer and the first pressure-sensitive adhesive layer; and a second pressure-sensitive adhesive layer affixed to the second surface.

In one embodiment, the pressure-sensitive adhesive tape further comprises a release liner affixed to the first pressure-sensitive adhesive layer or the second pressure-sensitive adhesive layer.

In one embodiment, the pressure-sensitive adhesive tape further comprises a primer layer sandwiched between the backing layer and the first pressure-sensitive adhesive layer; a second pressure-sensitive adhesive layer affixed to the second surface; and a release liner affixed to the first pressure-sensitive adhesive layer or the second pressure-sensitive adhesive layer.

In one embodiment, the backing layer comprises from 50 to 100% by weight of a paper material.

In one embodiment, the backing layer is impregnated with latex.

In one embodiment, the backing layer has a tensile strength in longitudinal direction of from 40 N/15 mm to 65 N/15 mm.

In one embodiment, the backing layer has an elongation ratio in longitudinal direction of 5%/15 mm to 12%/15 mm.

In one embodiment, the first pressure-sensitive adhesive layer comprises from 65% to 100% by weight of an acrylic polymer. The acrylic polymer comprises a monomer unit, 70% to 100% by weight of the monomer unit being derived from 2-ethylhexyl acrylate.

In one embodiment, the second pressure-sensitive adhesive layer comprises from 65% to 100% by weight of an acrylic polymer. The acrylic polymer comprises a monomer unit, 70% to 100% by weight of the monomer unit being derived from 2-ethylhexyl acrylate.

In one embodiment, the primer layer comprises a polyolefin polymer, a polyolefin elastomer polymer, an acrylic polymer or any combination thereof.

In one embodiment, the first pressure-sensitive adhesive layer has an adhesive strength of 2.0 N/10 mm to 5.0 N/10 mm in absence of a solvent.

In one embodiment, the first pressure-sensitive adhesive layer has an adhesive strength of 2.0 N/10 mm to 6.0 N/10 mm in absence of a solvent.

In one embodiment, the first pressure-sensitive adhesive layer has an adhesive strength of 2.0 N/10 mm to 7.0 N/10 mm in absence of a solvent.

In one embodiment, the first pressure-sensitive adhesive layer has an adhesive strength of 3.0 N/10 mm to 9.0 N/10 mm in absence of a solvent.

In one embodiment, the second pressure-sensitive adhesive layer has an adhesive strength of 2.0 N/10 mm to 8.0 N/10 mm in absence of a solvent.

In one embodiment, the second pressure-sensitive adhesive layer has an adhesive strength of 2.0 N/10 mm to 7.0 N/10 mm in absence of a solvent.

In one embodiment, the second pressure-sensitive adhesive layer has an adhesive strength of 3.0 N/10 mm to 8.0 N/10 mm in absence of a solvent.

In one embodiment, the pressure-sensitive adhesive tape has an elongation ratio in longitudinal direction of 6%/15 mm to 20%/15 mm.

In one embodiment, the pressure-sensitive adhesive tape has an elongation ratio in longitudinal direction of 6%/15 mm to 14%/15 mm.

In one embodiment, the pressure-sensitive adhesive tape has an elongation ratio in longitudinal direction of 7%/15 mm to 15%/15 mm.

In one embodiment, the pressure-sensitive adhesive tape has a tensile strength in longitudinal direction of 50 N/15 mm to 70 N/15 mm in width.

In one embodiment, the backing layer has a tensile strength in longitudinal direction of from 40 N/15 mm to 65 N/15 mm.

In one embodiment, the backing layer has an elongation ratio in longitudinal direction of 5%/15 mm to 12%/15 mm.

In one embodiment, the adhesive strength of the first pressure-sensitive adhesive layer in presence of a solvent has a difference of 1% to 20% from the adhesive strength of the first pressure-sensitive adhesive layer in absence of a solvent. The solvent is a water-based solvent or an emulsion-based solvent.

In one embodiment, the adhesive strength of the second pressure-sensitive adhesive layer in presence of a solvent has a difference of 1% to 20% from the adhesive strength of the second pressure-sensitive adhesive layer in absence of a solvent. The solvent is a water-based solvent or an emulsion-based solvent.

In one embodiment, the first pressure-sensitive adhesive layer (102) has an anchoring strength of 12.0 N/20 mm to 28.0 N/20 mm.

In one embodiment, the second pressure-sensitive adhesive layer (104) has an anchoring strength of 11.0 N/20 mm to 23.0 N/20 mm.

In one embodiment, the pressure-sensitive adhesive tape (100) has a shear adhesive strength of 23 N/19 mm×19 mm to 76 N/19 mm×19 mm in absence of a solvent. The solvent is a water-based solvent or an emulsion-based solvent.

The present invention discloses four of the preferred embodiments, namely the first embodiment, second embodiment, third embodiment and fourth embodiment whereby all four embodiments comprise the same backing layer and first pressure-sensitive adhesive layer, but some may further possess a primer layer, a second pressure-sensitive adhesive layer and/or a release liner. In the first embodiment, the pressure-sensitive adhesive layer comprises a backing layer and a first pressure-sensitive adhesive layer. In the second embodiment, the pressure-sensitive adhesive layer comprises a backing layer, a first pressure-sensitive adhesive layer and a primer layer. In the third embodiment, the pressure-sensitive adhesive layer comprises a backing layer, a first pressure-sensitive adhesive layer and a second pressure-sensitive adhesive layer. In the fourth embodiment, the pressure-sensitive adhesive layer comprises a backing layer, a first pressure-sensitive adhesive layer, a primer layer and a second pressure-sensitive adhesive layer.

The present invention provides several effects. Particularly, the pressure-sensitive adhesive layer of the pressure-sensitive adhesive tape of the invention has a relatively stable adhesive strength such that its adhesive strength does not substantially change when it comes in contact with a solvent. This means even though the pressure-sensitive adhesive layer or tape is wetted by a solvent and has not become completely dry, it can still bind to a substrate. Furthermore, the pressure-sensitive adhesive tape disclosed herein has a relatively high adhesive strength yet it is easy to be peeled from an adherend without delamination of the tape or cohesive failure. Besides, it does not break easily when it is being peeled off from an adherend. Moreover, it leaves minimal amount of residue on an adherend upon peeling.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

One skilled in the art will readily appreciate that the present invention is well adapted to carry out the objects and obtain the ends and advantages mentioned, as well as those inherent therein. The embodiment described herein is not intended as limitations on the scope of the invention.

The term "backing" as used herein can be used interchangeably with the term "carrier" unless otherwise mentioned.

The terms "adherend" and "substrate" as used herein refers to a surface to which the pressure-sensitive adhesive layer adheres.

The term "adhesive strength" as used herein refers to the adhesive strength of a pressure-sensitive adhesive layer with respect to a stainless steel plate (i.e., SUS 304 BA) after aging for up to 2 hours at room temperature and under atmospheric pressure.

The unit "N/10 mm" for adhesive strength as used herein refers to force per pressure-sensitive adhesive tape of 10 mm in width.

The unit "N/15 mm" for tensile strength as used herein refers to force per pressure-sensitive adhesive tape of 15 mm in width.

The unit "N/20 mm" for anchoring strength as used herein refers to force per pressure-sensitive adhesive tape of 20 mm in width.

The unit "%/15 mm" for elongation ratio as used herein refers to percent of tape elongation per pressure-sensitive adhesive tape of 15 mm in width.

The unit "N/19 mm×19 mm" for shear adhesive strength as used herein refers to force per pressure-sensitive adhesive tape of 19 mm in width and 19 mm in length.

The invention relates to a pressure-sensitive adhesive tape (100) comprising a backing layer (101) with having a first and a second surface and a first pressure-sensitive adhesive layer (102) affixed to the first surface of the backing layer (101), wherein the first pressure-sensitive adhesive layer (102) has an adhesive strength of 2.0 N/10 mm to 9.0 N/10 mm in absence of a solvent and the pressure-sensitive tape (100) has a tensile strength in longitudinal direction of 45 N/15 mm to 80 N/15 mm. The pressure-sensitive adhesive tape (100) of the invention may further comprise a primer layer (103), a second pressure-sensitive adhesive layer (104), a release liner (105) or any combination thereof. Any suitable configuration may be employed for the pressure-sensitive adhesive tape (100) of the invention within such a range as not to impair the effects of the present invention, as long as the pressure-sensitive adhesive tape (100) and the first pressure-sensitive adhesive tape (100) achieve the preferred tensile strength and the preferred adhesive strength, respectively.

In a preferred embodiment of the present invention, the backing layer (101) has a tensile strength in longitudinal direction of from 40 N/15 mm to 65 N/15 mm. It is also preferred that the backing layer (101) has an elongation ratio in longitudinal direction of 5%/15 mm to 12%/15 mm. Backing layer (101) having the preferred tensile strength and/or elongation ratio in longitudinal direction allows the pressure-sensitive adhesive tape (100) to be peeled from an adherend more easily without breaking off halfway during peeling.

The backing layer (101) may be formed of one or more layers. Any suitable material may be employed as the backing layer (101) as long as its tensile strength and/or elongation ratio in longitudinal direction is in agreement with the preferred range. Examples of material suitable for use as a backing layer (101) in the present invention include, but not limited to, a paper material or a plastic film. In one embodiment, materials that give a hand tearable backing layer (101) are preferred. Preferably, the backing layer (101) comprises a paper material in an amount ranging from 50% to 100% by weight of the backing layer (101). Examples of paper material include, but not limited to, crepe paper, washi paper, craft paper, flatback paper, tissue paper, fish paper, and clay-coated paper. In one embodiment of the invention, it is preferred that the backing layer (101) has a creped or crinkled texture on at least one surface. The backing layer (101) may also be impregnated with latex for enhanced tensile strength. In one embodiment, the backing layer (101) is waterproof.

As set forth in the preceding description, a first pressure-sensitive adhesive layer (102) is affixed to a surface of the backing layer (101). The first pressure-sensitive adhesive layer (102) is formed of a pressure-sensitive adhesive composition comprising a base polymer such as an acrylic polymer and a rubber polymer. Nevertheless, an acrylic polymer is preferred. The base polymer may constitute about 65% to 100% by weight of the total pressure-sensitive adhesive composition. It is preferred that when acrylic polymer is used as the base polymer of the first pressure-sensitive adhesive layer (102), 70% to 100% by weight of its monomer unit are derived from 2-ethylhexyl acrylate. The pressure-sensitive adhesive composition may further comprise a tackifier. Examples of suitable tackifier include, but not limited to, rosin ester, acid denatured resin, hydrogenation rosin ester, polymerization rosin, rosin phenol and terpene phenolic resin. Preferably, a rosin ester is used as the tackifier. The pressure-sensitive adhesive composition may also further comprise a coupling agent. Any known coupling agent can be used as long as it does not impair the effects of the invention. A silane coupling agent is one of the preferred coupling agents.

The first pressure-sensitive adhesive layer (102) of the invention is able to adhere to an adherend with adequate adhesive strength such that it will not gradually glide over the adherend. Preferably, the first pressure-sensitive adhesive layer (102) has an adhesive strength of 2.0 N/10 mm to 9.0 N/10 mm in absence of a solvent. In one embodiment of the invention, the adhesive strength of the first pressure-sensitive adhesive layer (102) in absence of a solvent ranges from 2.0 N/10 mm to 7.0 N/10 mm, or more preferably from 2.0 N/10 mm to 6.0 N/10 mm, or more preferably from 2.0 N/10 mm to 5.0 N/10 mm. In another embodiment of the invention, the adhesive strength of the first pressure-sensitive adhesive layer (102) in absence of a solvent ranges from 3.0 N/10 mm to 9.0 N/10 mm. In one embodiment where the first pressure-sensitive adhesive layer (102) comes in contact with a solvent, such as a water-based or an emulsion-based solvent, the adhesive strength of the first pressure-sensitive adhesive layer (102) changes by about 1% to 20%. In other words, the adhesive strength of the first pressure-sensitive adhesive layer (102) in presence of a solvent has a difference of about 1% to 20% from the adhesive strength of the first pressure-sensitive adhesive layer (102) in absence of a solvent.

In addition to the backing layer (101) and the first pressure-sensitive adhesive layer (102), the pressure-sensitive adhesive tape (100) disclosed herein may further comprise a second pressure-sensitive adhesive layer (104). The second pressure-sensitive adhesive layer (104) is formed of a pressure-sensitive adhesive composition, which may be identical to or different from the pressure-sensitive adhesive composition of the first pressure-sensitive adhesive layer (102). In one embodiment of the invention, the pressure-sensitive adhesive composition of the second pressure-sensitive adhesive layer (104) comprises a base polymer such as an acrylic polymer and a rubber polymer. Nevertheless, an acrylic polymer is preferred. The base polymer may constitute about 65% to 100% by weight of the total pressure-sensitive adhesive composition. It is preferred that when acrylic polymer is used as the base polymer of the pressure-sensitive adhesive layer, 70% to 100% by weight of its monomer unit are derived from 2-ethylhexyl acrylate. The pressure-sensitive adhesive composition may further comprise a tackifier, preferably a rosin ester. The pressure-sensitive adhesive composition may also further comprise a coupling agent, preferably a silane coupling agent.

In the preferred embodiment of the invention, the second pressure-sensitive adhesive layer (104) has an adhesive strength ranging from 2.0 N/10 mm to 8.0 N/10 mm in absence of a solvent. More preferably, the adhesive strength of the second pressure-sensitive adhesive layer (104) in absence of a solvent ranges from 2.0 N/10 mm to 7 N/10 mm. In another embodiment, the adhesive strength of the second pressure-sensitive adhesive layer (104) in absence of a solvent ranges from 3.0 N/10 mm to 8.0 N/10 mm. In one embodiment where the second pressure-sensitive adhesive layer (104) comes in contact with a solvent, such as a water-based or an emulsion-based solvent, the adhesive strength of the second pressure-sensitive adhesive layer (104) changes by 5% to 40%. In other words, the adhesive strength of the second pressure-sensitive adhesive layer (104) in presence of a solvent has a difference of about 5% to 40% from the adhesive strength of the second pressure-sensitive adhesive layer (104) in absence of a solvent.

Pursuant to the preceding description, the pressure-sensitive adhesive tape (100) of the invention may further comprise a primer layer (103). The primer layer (103) can be sandwiched between the backing layer (101) and the first pressure-sensitive adhesive layer (102) or between the backing layer (101) and the second pressure-sensitive adhesive layer (104). The primer layer (103) comprises a base polymer that helps to strengthen the bonds between the backing layer (101) and the pressure-sensitive adhesive layer (102, 104), thereby improving the anchoring strength of the pressure-sensitive adhesive layers (102, 104) as well as the cohesion of the pressure-sensitive adhesive composition. Any material that is capable of enhancing the bonds between the backing layer (101) and the pressure-sensitive adhesive layers (102, 104) can be used as the base polymer for fabrication of the primer layer (103). Preferably, the base polymer of the primer layer (103) includes a polyolefin polymer, a polyolefin elastomer polymer, an acrylic polymer or any combination thereof.

In the preferred embodiment of the invention, the first pressure-sensitive adhesive layer (102) and the second pressure-sensitive adhesive layer (104) exhibit adequate anchoring to the backing layer (101) or the primer layer (103). Particularly, the bonding between the first pressure-sensitive adhesive layer (102) or the second pressure-sensitive adhesive layer (104) and the backing layer (101) or the primer layer (103) is strong enough that it enables the first pressure-sensitive adhesive layer (102) or the second pressure-sensitive adhesive layer (104) and the backing layer (101) or the primer layer (103) to maintain as an integrated unit when the pressure-sensitive adhesive tape (100) is being peeled from the adherend and leave no or only a trace amount of the pressure-sensitive adhesive on the adherend. The first pressure-sensitive adhesive layer (102) has an anchoring strength of preferably 12.0 N/20 mm to 28.0 N/20 mm, more preferably 16.5 N/20 mm to 25.0 N/20 mm. The second pressure-sensitive adhesive layer (104) has an anchoring strength of preferably 11.0 N/20 mm to 23.0 N/20 mm, more preferably 15.5 N/20 mm to 19.0 N/20 mm.

The release liner can be affixed to the exposed or naked surface of the first pressure-sensitive adhesive layer (102) or the second pressure-sensitive adhesive layer (104) for protecting the exposed or naked surface of the pressure-sensitive adhesive layer from damage or contaminants when the pressure-sensitive adhesive tape (100) is not in use. The release liner is not particularly limited material-wise or construction-wise. Any known release liner can be used in the present invention provided it does not impair the effects of the invention. A preferable release liner has at least one surface that has been provided with a release layer made of a release agent. The substrate constituting the release liner can be selected from the group consisting of paper material, plastic film, fabric, rubber sheet, foam sheet, metal foil, and any composite thereof. The release agent forming the release layer may be a silicone-based release agent, a fluorine-based release agent, or a long-chain alkyl-type release agent.

The pressure-sensitive adhesive tape (100) disclosed herein exhibits shear adhesive strength high enough that delamination of the pressure-sensitive adhesive tape (100) during peeling of the pressure-sensitive adhesive tape (100) off an adherend is unlikely. Hence, the pressure-sensitive adhesive tape (100) can be peeled off an adherend as a whole. Preferably, the pressure-sensitive adhesive tape (100) has a shear adhesive strength within the range of 23.0 N/19 mm×19 mm to 76.0 N/19 mm×19 mm in absence of any solvent. On the other hand, in presence of a solvent such as water-based or emulsion-based solvent, the shear adhesive strength of the pressure-sensitive adhesive tape (100) falls within the range of 1.0 N/19 mm×19 mm to 20.0 N/19 mm×19 mm.

The present invention discloses four of the preferred embodiments, namely the first embodiment, second embodiment, third embodiment and fourth embodiment whereby all four embodiments comprise the same backing layer (101) and first pressure-sensitive adhesive layer (102), but some may further possess a primer layer (103), a second pressure-sensitive adhesive layer (104) and/or a release liner (105). Other possible configurations of the pressure-sensitive adhesive tape (100) that are not covered in these embodiments can also be employed provided that the effects of the invention are achievable. The total thickness of the pressure-sensitive adhesive tape (100) described in these embodiments ranges from 110 μm to 230 μm. Nevertheless, so far as the effect of the invention can be achieved the total thickness of the pressure-sensitive adhesive tape (100) may go beyond 220 μm.

Figure 1:
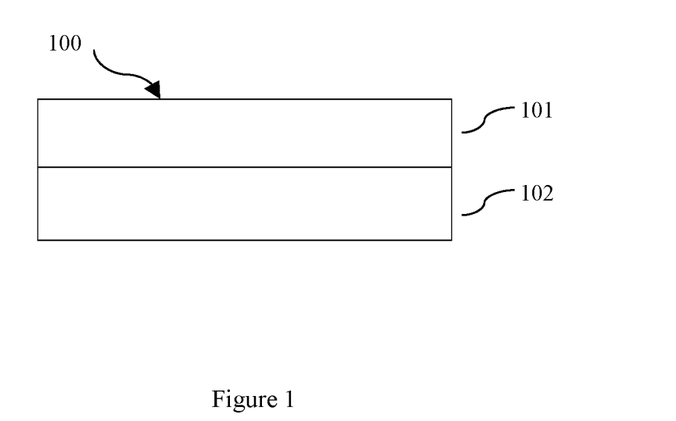
FIG. 1 is a schematic sectional view of a pressure-sensitive adhesive tape according to the first preferred embodiment of the invention.

FIG. 1 is a schematic sectional view of a pressure-sensitive adhesive tape (100) according to the first preferred embodiment of the present invention. As shown in FIG. 1, the pressure-sensitive adhesive tape (100) includes a backing layer (101) and a first pressure-sensitive adhesive layer (102) that is affixed thereon. The first pressure-sensitive adhesive layer (102) may form on either the first surface or the second surface of the backing layer (101). Preferably, the first pressure-sensitive adhesive layer (102) has an adhesive strength of 2.0 N/10 mm to 5.0 N/10 mm in absence of a solvent. The anchoring strength of the first pressure-sensitive adhesive layer (102) falls within the range of 14.0 N/20 mm to 24.0 N/20 mm. The pressure-sensitive adhesive tape (100) of the first preferred embodiment has a tensile strength in the longitudinal direction of 50 N/15 mm to 70 N/15 mm and an elongation ratio of 6%/15 mm and 14%/15 mm.

Figure 2:
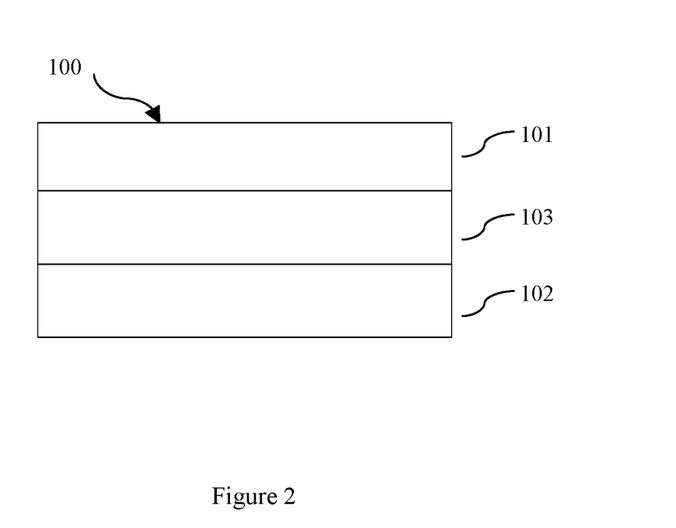
FIG. 2 is a schematic sectional view of a pressure-sensitive adhesive tape according to the second preferred embodiment of the invention.

FIG. 2 is a schematic sectional view of a pressure-sensitive adhesive tape (100) according to the second preferred embodiment of the present invention. As shown in FIG. 2, the pressure-sensitive adhesive tape (100) includes a backing layer (101), a first pressure-sensitive adhesive layer (102) that is affixed to a surface of the backing layer (101) and a primer layer (103). The first pressure-sensitive adhesive layer (102) may form on either the first surface or the second surface of the backing layer (101). The primer layer (103) is sandwiched between the backing layer (101) and the first pressure-sensitive adhesive layer (102). Preferably, the first pressure-sensitive adhesive layer (102) has an adhesive strength of 2.0 N/10 mm to 6.0 N/10 mm in absence of a solvent. The anchoring strength of the first pressure-sensitive adhesive layer (102) falls within the range of 12.0 N/20 mm to 23.0 N/20 mm. The pressure-sensitive adhesive tape (100) of the second preferred embodiment has a tensile strength in the longitudinal direction of 50 N/15 mm to 70 N/15 mm and an elongation ratio of 6%/15 mm and 14%/15 mm.

Figure 3:
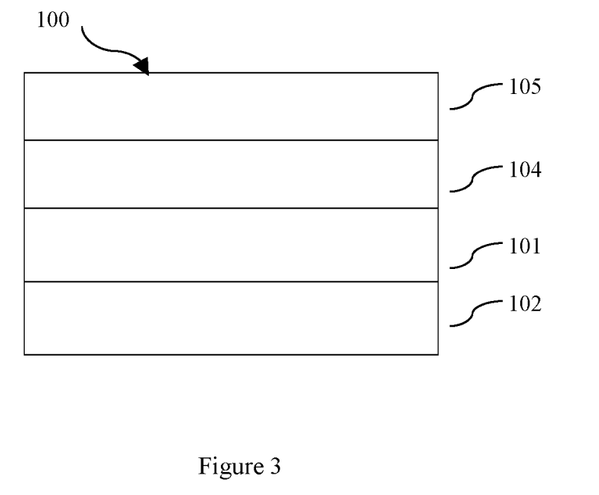
FIG. 3 is a schematic sectional view of a pressure-sensitive adhesive tape according to the third preferred embodiment of the invention.

FIG. 3 is a schematic sectional view of a pressure-sensitive adhesive tape (100) according to the third preferred embodiment of the present invention. As shown in FIG. 3, the pressure-sensitive adhesive tape (100) includes a backing layer (101), a first pressure-sensitive adhesive layer (102), a second pressure-sensitive adhesive layer (104) and a release liner (105). The first pressure-sensitive adhesive layer (102) and the second pressure-sensitive adhesive layer (104) are formed on opposite surfaces of the backing layer (101). The release liner (105) is affixed to the exposed or naked surface of the second pressure-sensitive adhesive layer (104). Preferably, the first pressure-sensitive adhesive layer (102) has an adhesive strength of 2.0 N/10 mm to 7.0 N/10 mm in absence of a solvent and an anchoring strength of 12.0 N/20 mm to 30.0 N/20 mm. The second pressure-sensitive adhesive layer (104) has an adhesive strength of 2.0 N/10 mm to 7.0 N/10 mm in absence of a solvent and an anchoring strength of 11.0 N/20 mm to 24.0 N/20 mm. The pressure-sensitive adhesive tape (100) of the second preferred embodiment has a tensile strength in the longitudinal direction of 50 N/15 mm to 70 N/15 mm and an elongation ratio of 7%/15 mm and 15%/15 mm. It has a shear adhesive strength of between 24 N/19 mm×19 mm and 74 N/19 mm×19 mm in absence of a solvent and a shear adhesive strength of between 1 N/19 mm×19 mm to 20 N/19 mm×19 mm in presence of a water-based or emulsion-based solvent.

Figure 4:
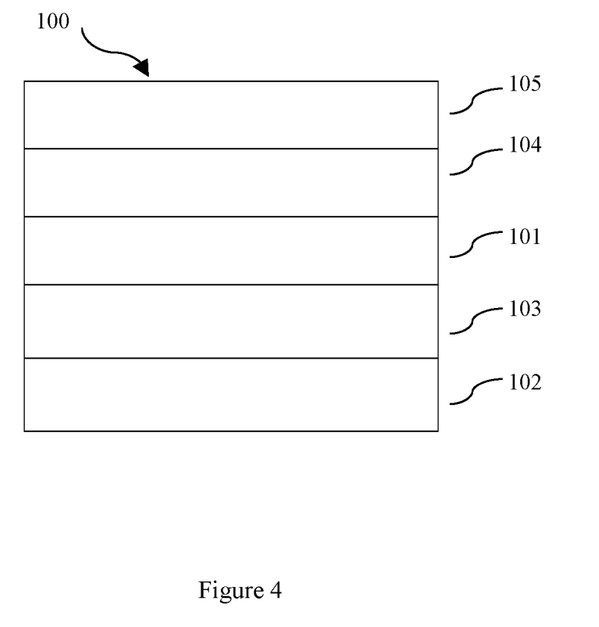
FIG. 4 is a schematic sectional view of a pressure-sensitive adhesive tape according to the fourth preferred embodiment of the invention.

FIG. 4 is a schematic sectional view of a pressure-sensitive adhesive tape (100) according to the fourth preferred embodiment of the present invention. As shown in FIG. 4, the pressure-sensitive adhesive tape (100) includes a backing layer (101), a first pressure-sensitive adhesive layer (102) that is affixed to a surface of the backing layer (101), a primer layer (103), a second pressure-sensitive adhesive layer (104) and a release liner (105). The first pressure-sensitive adhesive layer (102) and the second pressure-sensitive adhesive layer (104) are formed on opposite surfaces of the backing layer (101). The primer layer (103) is sandwiched between the backing layer (101) and the first pressure-sensitive adhesive layer (102). The release liner (105) is formed on the exposed or naked surface of the second pressure-sensitive adhesive layer (104). Preferably, the first pressure-sensitive adhesive layer (102) has an adhesive strength of 3.0 N/10 mm to 9.0 N/10 mm in absence of a solvent and an anchoring strength of 18.0 N/20 mm to 36.0 N/20 mm. The second pressure-sensitive adhesive layer (104) has an adhesive strength of 3.0 N/10 mm to 8.0 N/10 mm in absence of a solvent and an anchoring strength of 17.0 N/20 mm to 26.0 N/20 mm. The pressure-sensitive adhesive tape (100) of the second preferred embodiment has a tensile strength in the longitudinal direction of 50 N/15 mm to 70 N/15 mm and an elongation ratio of 7%/15 mm and 15%/15 mm. It also has a shear adhesive strength of between 32 N/19 mm×19 mm and 75 N/19 mm×19 mm in absence of a solvent and a shear adhesive strength of between 1.0 N/19 mm×19 mm to 20.0 N/19 mm×19 mm in presence of a water-based or emulsion-based solvent.

In one exemplary embodiment, the pressure-sensitive adhesive tape (100) comprising a backing layer (101), a first pressure-sensitive adhesive layer (102), a second pressure-sensitive adhesive layer (104), a primer layer (103) and a release liner (105) can be used for installing a golf grip onto a golf club shaft. Particularly, the primer layer (103) is sandwiched between the backing layer (101) and the pressure-sensitive adhesive layer that is supposed to be adhered to the club shaft, either the first pressure-sensitive adhesive layer (102) or the second pressure-sensitive adhesive layer (104). Such configuration allows the pressure-sensitive adhesive tape (100) to leave minimal or trace amount of adhesive on the shaft surface during removal of the tape. Preferably, the pressure-sensitive adhesive layer for adhering to the golf club shaft has an adhesive strength of 3.0 N/10 mm to 9.0 N/10 mm in absence of a solvent, whereby the adhesive strength of that pressure-sensitive adhesive layer changes by 1% to 20% when that pressure-sensitive adhesive layer comes into contact with a lubricating solvent, such as a water-based lubricating solvent or an emulsion-based lubricating solvent. It is also preferred that the pressure-sensitive adhesive layer for adhering to the golf grip has an adhesive strength of 3.0 N/10 mm to 8.0 N/10 mm in absence of a solvent, whereby the adhesive strength of that pressure-sensitive adhesive layer changes by 5% to 40% when that pressure-sensitive adhesive layer comes into contact with a lubricating solvent, such as a water-based lubricating solvent or an emulsion-based lubricating solvent. Furthermore, the anchoring strength of the pressure-sensitive adhesive layers is preferably 17.0 N/20 mm to 28.0 N/20 mm. The shear strength of the pressure-sensitive adhesive tape is preferably 32.0 N/19 mm×19 mm to 76.0 N/19 mm×19 mm in absence of any lubricating solvent and 2.0 N/19 mm×19 mm to 20.0 N/19 mm×19 mm in presence of a water-based or an emulsion-based lubricating solvent.

EXAMPLES

Examples are provided below to illustrate different aspects and embodiments of the invention. The examples are not intended in any way to limit the disclosed invention, which is limited only by the claims.

Example 1

Preparation of a Pressure-Sensitive Adhesive Composition

In 100 parts of ion-exchanged water, a monomer mixture, a tertiary mercaptan (chain transfer agent) and emulsifier are mixed at a ratio of 100.02/0.048/2.0 and emulsified to prepare an aqueous emulsion of the monomer mixture (monomer emulsion). The initial monomer mixture contains 2-ethylmethyl acrylate (2EHA), methyl acrylate (MA), acrylic acid (AA), methacrylic acid (MAA) and 3-methacryloxypropyltrimethoxysilane. As the emulsifier, a sodium polyoxyethylene alkyl ether sulfate is used.

The monomer emulsion is added to a reaction vessel equipped with a condenser, nitrogen inlet, thermometer and stirrer and let stir at room temperature for at least one hour under a nitrogen flow. Subsequently, the system is heated to 60° C. 0.1 part of 2,2'-azobis[N-(2-carboxyethyl)-2-methylpropionamidine]hydrate (polymerization initiator) is added to the reaction vessel. While keeping the system at 60° C., the monomer emulsion is reacted for six hours. After the system is cooled to room temperature, 10% ammonia water is added to obtain a water dispersion of acrylic polymer.

30 parts of a rosin ester-based tackifying agent with softening point of 125° C. and 0.067 part of a silicon compound, n-decyltrimethoxysilane, is added to the water dispersion of the acrylic polymer, based on non-volatiles, for 100 parts of the acrylic polymer (base polymer). The pH and viscosity of the mixture are then adjusted by using 10% ammonia water as a pH adjuster and polyacrylic acid (aqueous 36% non-volatile solution) as a thickener.

Example 2

Preparation of a Pressure-Sensitive Adhesive Tape (1)

A crepe paper having a basis weight of 40 g/m$^2$-75 g/m$^2$ and a thickness of 85-150 μm is used as the backing layer (101) of the tape. The crepe paper has been impregnated with latex. The pressure-sensitive adhesive composition prepared in Example 1 is applied to the first surface of the backing layer (101) and dried at 100° C. for 2 minutes to form a first pressure-sensitive adhesive layer (PSA1) (102) having a thickness of 30 μm. The laminate having "crepe paper/PSA1" construction is passed or pressed once through a laminator at roll temperature of 80° C., at a pressure of 0.3 MPa and a rate of 0.5 m/min. A pressure-sensitive adhesive tape (100) having a configuration as described in the first preferred embodiment is then obtained.

Example 3

Preparation of a Pressure-Sensitive Adhesive Tape (2)

A crepe paper having a basis weight of 40 g/m$^2$-75 g/m$^2$ and a thickness of 85-150 μm is used as the backing layer (101) of the tape. The crepe paper has been impregnated with latex. A rubber emulsion is applied as a primer layer (103) to a first surface of the backing layer. The pressure-sensitive adhesive composition prepared in Example 1 is applied to the first surface of the primer layer (103) and dried at 100° C. for 2 minutes to form a first pressure-sensitive adhesive layer (102) having a thickness of 30 μm. The laminate having "crepe paper/primer layer/PSA1" construction is passed or pressed once through a laminator at roll temperature of 80° C., at a pressure of 0.3 MPa and a rate of 0.5 m/min. A pressure-sensitive adhesive tape (100) having a configuration as described in the second preferred embodiment is then obtained.

Example 4

Preparation of a Pressure-Sensitive Adhesive Tape (3)

A crepe paper having a basis weight of 40 g/m$^2$-75 g/m$^2$ and a thickness of 85-150 μm is used as the backing layer (101) of the tape. The crepe paper has been impregnated with latex. The pressure-sensitive adhesive composition prepared in Example 1 is applied to the first surface of the backing layer (101) and dried at 100° C. for 2 minutes to form a first pressure-sensitive adhesive layer (PSA1) (102) having a thickness of 30 μm. Then, the pressure-sensitive adhesive composition prepared in Example 1 is applied to the second surface of the backing layer (101) and dried at 100° C. for 2 minutes to form a second pressure-sensitive adhesive layer (PSA2) (104) having a thickness of 40 μm. A crepe paper having both surfaces treated with a silicon-based release agent is affixed to the pressure-sensitive adhesive surface of the formed second pressure-sensitive adhesive layer (104). The laminate having "PSA2/crepe paper/PSA1" construction is passed or pressed once through a laminator at roll temperature of 80° C., at a pressure of 0.3 MPa and a rate of 0.5 m/min. Then, a pressure-sensitive adhesive tape (100) having a configuration as described in the third preferred embodiment is obtained.

Example 5

Preparation of a Pressure-Sensitive Adhesive Tape (4)

A crepe paper having a basis weight of 40 g/m$^2$-75 g/m$^2$ and a thickness of 85-150 μm is used as the backing layer (101) of the tape. The crepe paper has been impregnated with latex. A rubber emulsion is applied as a primer layer (103) to a first surface of the backing layer. The pressure-sensitive adhesive composition prepared in Example 1 is applied to the first surface of the primer layer (103) and dried at 100° C. for 2 minutes to form a first pressure-sensitive adhesive layer (PSA1) (102) having a thickness of 30 μm. Then, the pressure-sensitive adhesive composition prepared in Example 1 is applied to the second surface of the backing layer (101) and dried at 100° C. for 2 minutes to form a second pressure-sensitive adhesive layer (PSA2) (104) having a thickness of 40 μm. A crepe paper having both surfaces treated with a silicon-based release agent is affixed to the pressure-sensitive adhesive surface of the formed second pressure-sensitive adhesive layer (104). The laminate having "PSA2/crepe paper/primer layer/PSA1" construction is passed or pressed once through a laminator at roll temperature of 80° C., at a pressure of 0.3 MPa and a rate of 0.5 m/min. Then, a pressure-sensitive adhesive tape (100) having a configuration as described in the fourth preferred embodiment is obtained.

Example 6

Preparation of a Pressure-Sensitive Adhesive Tape (5)

A pressure-sensitive adhesive tape (100) is prepared according to Example 2 except a washi paper is used as the backing layer (101) instead of a crepe paper.

Example 7

Preparation of a Pressure-Sensitive Adhesive Tape (6)

A pressure-sensitive adhesive tape (100) is prepared according to Example 3 except a washi paper is used as the backing layer (101) instead of a crepe paper.

Example 8

Preparation of a Pressure-Sensitive Adhesive Tape (7)

A pressure-sensitive adhesive tape (100) is prepared according to Example 4 except a washi paper is used as the backing layer (101) instead of a crepe paper.

Example 9

Preparation of a Pressure-Sensitive Adhesive Tape (8)

A pressure-sensitive adhesive tape (100) is prepared according to Example 5 except a washi paper is used as the backing layer (101) instead of a crepe paper.

Example 10

Preparation of a Pressure-Sensitive Adhesive Tape (9)

A pressure-sensitive adhesive tape (100) is prepared according to Example 2 except a rubber-based pressure-sensitive adhesive composition is used instead of the acrylic-based pressure-sensitive adhesive composition prepared in Example 1.

Example 11

Preparation of a Pressure-Sensitive Adhesive Tape (10)

A pressure-sensitive adhesive tape (100) is prepared according to Example 3 except a rubber-based pressure-sensitive adhesive composition is used instead of the acrylic-based pressure-sensitive adhesive composition prepared in Example 1.

Example 12

Preparation of a Pressure-Sensitive Adhesive Tape (11)

A pressure-sensitive adhesive tape (100) is prepared according to Example 4 except a rubber-based pressure-sensitive adhesive composition is used instead of the acrylic-based pressure-sensitive adhesive composition prepared in Example 1.

Example 13

Preparation of a Pressure-Sensitive Adhesive Tape (12)

A pressure-sensitive adhesive tape (100) is prepared according to Example 5 except a rubber-based pressure-sensitive adhesive composition is used instead of the acrylic-based pressure-sensitive adhesive composition prepared in Example 1.

Example 14

Preparation of a Pressure-Sensitive Adhesive Tape (13)

A pressure-sensitive adhesive tape (100) is prepared according to Example 6 except a rubber-based pressure-sensitive adhesive composition is used instead of the acrylic-based pressure-sensitive adhesive composition prepared in Example 1.

Example 15

Preparation of a Pressure-Sensitive Adhesive Tape (14)

A pressure-sensitive adhesive tape (100) is prepared according to Example 7 except a rubber-based pressure-sensitive adhesive composition is used instead of the acrylic-based pressure-sensitive adhesive composition prepared in Example 1.

Example 16

Preparation of a Pressure-Sensitive Adhesive Tape (15)

A pressure-sensitive adhesive tape (100) is prepared according to Example 8 except a rubber-based pressure-sensitive adhesive composition is used instead of the acrylic-based pressure-sensitive adhesive composition prepared in Example 1.

Example 17

Preparation of a Pressure-Sensitive Adhesive Tape (16)

A pressure-sensitive adhesive tape (100) is prepared according to Example 9 except a rubber-based pressure-sensitive adhesive composition is used instead of the acrylic-based pressure-sensitive adhesive composition prepared in Example 1.

Example 18

Measurement of Thickness

The total thickness and the thickness of each layer of the pressure-sensitive adhesive tapes (1) to (16) prepared according to Examples 2 to 17 are measured with $1/1000$ mm dial gauge (DG-205, Peacock). The results are shown in Table 1.

Example 19

Measurement of Adhesive Strength (1)

The pressure-sensitive adhesive tapes (1) to (16) prepared according to Examples 2 to 17 are cut into samples with a width of 10 mm and a length of 80 mm. The adhesive strength of the first pressure-sensitive adhesive layer (102) in each sample is measured by adhering the exposed surface of the first pressure-sensitive adhesive layer (102) of a sample onto a stainless steel and rolling a roller of 2.0 kg over the pressure-sensitive adhesive tape under atmospheric pressure at a temperature of 23° C. and a humidity of 50% relative humidity (RH). The resultant is aged for 30 minutes under atmospheric pressure at a temperature of 23° C. and a humidity of 50% RH. After that, the pressure-sensitive adhesive layer (102) is peeled off at a peel angle of 180° and a rate of pulling of 300 mm/min through the use of a universal tensile tester (Universal Tensile Testing Machine AG-IS Series, SLBL-50N, Shimadzu) to measure the pressure-sensitive adhesive strength of the first pressure-sensitive adhesive layer. The adhesive strength of the first pressure-sensitive adhesive layer (102) after 2 hours of aging is measured using another sample of the same kind.

The adhesive strength of the second pressure-sensitive adhesive layer (104) in samples of pressure-sensitive adhesive tapes (3), (4), (7), (8), (11), (12), (15), and (16) prepared according to Examples 4, 5, 8, 9, 12, 13, 16 and 17 after 30 minutes and 2 hours of aging is measured using the same method.

The results are shown in Table 1.

Example 20

Measurement of Adhesive Strength (2)

The pressure-sensitive adhesive tapes (1) to (16) prepared according to Examples 2 to 17 are cut into samples with a width of 10 mm and a length of 80 mm. The adhesive strength of the first pressure-sensitive adhesive layer (102) in each sample is measured by adhering the exposed surface of the first pressure-sensitive adhesive layer (102) of a sample onto a stainless steel and rolling a roller of 2.0 kg over the pressure-sensitive adhesive tape under atmospheric pressure at a temperature of 23° C. and a humidity of 50% relative humidity (RH). 3 drops of water-based lubricant are applied onto the other surface of the adhesive layer. The resultant is aged for 30 minutes under atmospheric pressure at a temperature of 23° C. and a humidity of 50% RH. After that, the pressure-sensitive adhesive layer (102) is peeled off at a peel angle of 180° and a rate of pulling of 300 mm/min through the use of a universal tensile tester (Universal Tensile Testing Machine AG-IS Series, SLBL-50N, Shimadzu) to measure the pressure-sensitive adhesive strength of the first pressure-sensitive adhesive layer (102). The adhesive strength of the second pressure-sensitive adhesive layer (104) in samples of pressure-sensitive adhesive tapes (3), (4), (7), (8), (11), (12), (15), and (16) prepared according to Examples 4, 5, 8, 9, 12, 13, 16 and 17 after 30 minutes of aging is measured using the same method.

The above steps are repeated except an emulsion-based lubricant is used instead of a water-based lubricant.

The results are shown in Table 2.

Example 21

Measurement of Tensile Strength

The pressure-sensitive adhesive tapes (1) to (16) prepared according to Examples 2 to 17 are cut into samples with a width of 15 mm and a length of 100 mm. All release liners (105) on the samples are removed prior to the measurement. The sample is pulled with a chuck distance at 100 mm at a rate of pulling of 300 mm/min under atmospheric pressure at a temperature of 23° C. and a humidity of 50% RH through the use of a universal tensile and compression tester (Universal Tensile Testing Machine AG-IS Series, SLBL-1 kN, Shimadzu) to read the stress at time of fracture. The measurement is repeated for multiple times and the average reading is defined as the tensile strength of the pressure-sensitive adhesive tape (100).

The results are shown in Table 1.

Example 22

Measurement of Elongation Ratio

The pressure-sensitive adhesive tapes (1) to (16) prepared according to Examples 2 to 17 are cut into samples with a width of 15 mm and a length of 100 mm. All release liners (105) on the samples are removed prior to the measurement. The sample is pulled with a chuck distance at 100 mm at a rate of pulling of 300 mm/min under atmospheric pressure at a temperature of 23° C. and a humidity of 50% RH through the use of a universal tensile and compression tester (Universal Tensile Testing Machine AG-IS Series, SLBL-1 kN, Shimadzu) to the length at time of fracture. The measurement is repeated for multiple times and the average reading is used for calculation of the elongation ratio of the pressure-sensitive adhesive tape. The elongation ratio can be calculated using Formula 1.

$$\text{Elongation ratio (\%)} = 100 \times \text{length at time of fracture} / \text{chuck distance} \qquad \text{[Formula 1]}$$

The results are shown in Table 1.

Example 23

Anchoring Strength Test

The pressure-sensitive adhesive tapes (1) to (16) prepared according to examples 2 to 17 are cut into samples with a width of 20 mm and a length of 20 mm. All release liners (105) on the samples are removed prior to the measurement. In an environment of 23° C. and 50% RH, the second pressure-sensitive adhesive layer (104) (PSA2) of the sample is applied and fixed onto a stainless steel plate (i.e. SUS plate BA) via a commercially available double-sided pressure-sensitive adhesive tape, such as product no. 512 of Nitto Denko Corporation. Subsequently, a commercially available single-sided pressure-sensitive adhesive tape of 20 mm width and 100 mm length, such as product no. 315 of Nitto Denko Corporation, is layered over the first pressure-sensitive adhesive layer (102) (PSA1) of the sample. A 2 kg roller is placed and moved back and forth once on the laminate for press-bonding the adhesive surface of the first pressure-sensitive adhesive layer (102) of the sample to the adhesive surface of the single-sided pressure-sensitive adhesive tape. During the press-bonding process, at one end of the sample in the length direction, a paper strip of about 90 μm thickness, 20 mm width and 30 mm length is disposed and sandwiched between the adhesive surface of the first pressure-sensitive adhesive layer (102) of the sample and the adhesive surface of the single-sided pressure-sensitive adhesive tape. Particularly, a portion of 10 mm-long of the paper strip is disposed therebetween while the remaining portion of 20 mm-long of the paper strip is exposed on the outside of the laminate in the length direction of the sample. The laminate is then allow to age for 30 minutes in the same environment. Subsequently, the exposed portion of the paper strip is fixed with a chuck. By using a tensile tester (Universal Tensile Testing Machine AG-IS series, SLBL-1 kN, Shimadzu), the first pressure-sensitive adhesive layer (102)

and the backing layer (101) are forcibly peeled apart at a peel angle of 180° and a tensile speed of 300 mm/min. The peel strength (N/20 mm) during the peeling is recorded. The measurement is repeated for multiple times and the average reading is defined as the anchoring strength of the first pressure-sensitive adhesive layer (102) (PSA1).

For measuring the anchoring strength of the second pressure-sensitive adhesive layer (104) (PSA2), the above steps are repeated but this time with the first pressure-sensitive adhesive layer (102) (PSA1) being fixed onto the stainless steel plate (i.e. SUS plate BA) via a commercially available double-sided pressure-sensitive adhesive tape, a commercially available single-sided pressure-sensitive adhesive tape being layered on the adhesive surface of the second pressure-sensitive adhesive layer (104), and the paper strip being disposed and sandwiched between the adhesive surface of the second pressure-sensitive adhesive layer (104) of the sample to the adhesive surface of the single-sided pressure-sensitive adhesive tape.

The results are shown in Table 3.

Example 24

Shear Adhesive Strength Test

The pressure-sensitive adhesive tapes (3), (4), (8) and (16) prepared according to examples 4, 5, 9 and 17, respectively, are cut into samples with a width of 19 mm and a length of 19 mm. All release liners on the samples are removed prior to the measurement. The first pressure-sensitive adhesive layer of each sample is adhered to a stainless steel plate on one surface while the second pressure-sensitive adhesive layer is adhered to a neoprene sheet. A roller of 2 kg is rolled over the sandwich for at least 2 times at 23° C. and humidity of 50% RH. The samples are aged for 2 hours. After that, the neoprene sheet and the stainless steel plate are pulled with a chuck distance at 100 mm at a rate of pulling of 300 mm/min under atmospheric pressure at a temperature of 23° C. and a humidity of 50% RH through the use of a universal tensile and compression tester (Universal Tensile Testing Machine AG-IS series, SLBL-1 kN, Shimadzu) and the shear strength is recorded. The measurement is repeated for multiple times and the average reading is defined as the shear strength of the pressure-sensitive adhesive tape. The shear strength of the pressure-sensitive adhesive tape after 24 hours of aging is measured using another set of samples.

The above steps are repeated by adding a specified amount of lubricating solvent onto the exposed surface of the pressure-sensitive adhesive tape after the pressure-sensitive adhesive tape is applied onto the stainless steel plate.

The results are shown in Table 4.

TABLE 1

| | | Pressure-sensitive adhesive tape | | | | | | | |
|---|---|---|---|---|---|---|---|---|---|
| | | (1) | (2) | (3) | (4) | (5) | (6) | (7) | (8) | (9) |
| Type of backing layer | | Crepe paper | Crepe paper | Crepe paper | Crepe paper | Washi paper | Washi paper | Washi paper | Washi paper | Crepe paper |
| Type of adhesive | | Acrylic-based | Acrylic-based | Acrylic-based | Acrylic-based | Acrylic-based | Acrylic-based | Acrylic-based | Acrylic-based | Rubber-based |
| Presence of primer layer | | No | Yes | No | Yes | No | Yes | No | Yes | No |
| Thickness of tape (μm) | | 110-150 | 110-155 | 140-195 | 140-200 | 75-120 | 75-125 | 100-155 | 100-160 | 110-150 |
| Thickness of PSA1 (μm) | | 30 | 30 | 30 | 30 | 30 | 30 | 30 | 30 | 30 |
| Thickness of PSA2 (μm) | | N/A | N/A | 40 | 40 | N/A | N/A | 40 | 40 | N/A |
| Tape tensile strength (machine direction) (N/15 mm) | | 60.551 | 58.227 | 59.340 | 55.675 | 45.592 | 51.691 | 46.694 | 52.333 | 62.323 |
| Tape elongation (machine direction) (%/15 mm) | | 11.148 | 10.405 | 10.674 | 8.933 | 9.805 | 8.472 | 6.155 | 6.052 | 7.399 |
| Adhesive strength of PSA1 (N/10 mm) | 30 min | 3.990 | 4.137 | 3.797 | 5.093 | 3.217 | 2.958 | 2.208 | 3.046 | 3.426 |
| | 2 hr | 3.183 | 3.914 | 4.872 | 5.876 | 5.276 | 5.145 | 5.815 | 6.559 | 3.274 |
| Adhesive strength of PSA2 (N/10 mm) | 30 min | N/A | N/A | 4.488 | 4.466 | N/A | N/A | 4.456 | 4.239 | N/A |
| | 2 hr | N/A | N/A | 5.258 | 5.122 | N/A | N/A | 5.478 | 5.785 | N/A |

| | Pressure-sensitive adhesive tape | | | | | |
|---|---|---|---|---|---|---|
| | (10) | (11) | (12) | (13) | (14) | (15) | (16) |
| Type of backing layer | Crepe paper | Crepe paper | Crepe paper | Washi paper | Washi paper | Washi paper | Washi paper |
| Type of adhesive | Rubber-based | Rubber-based | Rubber-based | Rubber-based | Rubber-based | Rubber-based | Rubber-based |
| Presence of primer layer | Yes | No | Yes | No | Yes | No | Yes |
| Thickness of tape (μm) | 110-155 | 140-195 | 140-200 | 75-120 | 75-125 | 100-155 | 100-160 |
| Thickness of PSA1 (μm) | 30 | 30 | 30 | 30 | 30 | 30 | 30 |

TABLE 1-continued

|  |  |  |  |  |  |  |  |  |
|---|---|---|---|---|---|---|---|---|
| Thickness of PSA2 (μm) |  | N/A | 40 | 40 | N/A | N/A | 40 | 40 |
| Tape tensile strength (machine direction) (N/15 mm) |  | 66.129 | 65.875 | 67.742 | 68.548 | 63.410 | 66.658 | 74.704 |
| Tape elongation (machine direction) (%/15 mm) |  | 10.583 | 10.210 | 9.129 | 8.161 | 9.221 | 13.463 | 11.014 |
| Adhesive strength of PSA1 (N/10 mm) | 30 min | 2.660 | 2.327 | 2.113 | 3.929 | 4.346 | 4.439 | 4.294 |
|  | 2 hr | 2.889 | 2.266 | 1.107 | 4.124 | 4.114 | 4.235 | 4.717 |
| Adhesive strength of PSA2 (N/10 mm) | 30 min | N/A | 3.636 | 3.886 | N/A | N/A | 6.103 | 4.358 |
|  | 2 hr | N/A | 2.610 | 3.673 | N/A | N/A | 4.993 | 6.164 |

TABLE 2

|  |  | Pressure-sensitive adhesive tape | | | | | | | | |
|---|---|---|---|---|---|---|---|---|---|---|
|  |  | (1) | (2) | (3) | (4) | (5) | (6) | (7) | (8) | (9) |
| Type of backing layer |  | Crepe paper | Crepe paper | Crepe paper | Crepe paper | Washi paper | Washi paper | Washi paper | Washi paper | Crepe paper |
| Type of adhesive |  | Acrylic-based | Acrylic-based | Acrylic-based | Acrylic-based | Acrylic-based | Acrylic-based | Acrylic-based | Acrylic-based | Rubber-based |
| Presence of primer layer |  | No | Yes | No | Yes | No | Yes | No | Yes | No |
| Adhesive strength of PSA1 (N/10 mm) | Without lubricant | 3.990 | 4.137 | 3.797 | 5.093 | 3.217 | 2.958 | 2.208 | 3.046 | 3.426 |
|  | With water-based lubricant | 3.991 | 3.973 | 3.989 | 4.289 | 4.080 | 4.163 | 3.080 | 2.889 | 1.817 |
|  | With emulsion-based lubricant | 3.463 | 4.074 | 3.577 | 4.246 | 3.582 | 4.173 | 2.864 | 3.028 | 2.535 |
| Adhesive strength of PSA2 (N/10 mm) | Without lubricant | N/A | N/A | 4.488 | 4.466 | N/A | N/A | 4.456 | 4.239 | N/A |
|  | With water-based lubricant | N/A | N/A | 3.501 | 2.905 | N/A | N/A | 3.041 | 3.256 | N/A |
|  | With emulsion-based lubricant | N/A | N/A | 4.114 | 3.652 | N/A | N/A | 2.903 | 3.074 | N/A |

|  |  | Pressure-sensitive adhesive tape | | | | | | |
|---|---|---|---|---|---|---|---|---|
|  |  | (10) | (11) | (12) | (13) | (14) | (15) | (16) |
| Type of backing layer |  | Crepe paper | Crepe paper | Crepe paper | Washi paper | Washi paper | Washi paper | Washi paper |
| Type of adhesive |  | Rubber-based | Rubber-based | Rubber-based | Rubber-based | Rubber-based | Rubber-based | Rubber-based |
| Presence of primer layer |  | Yes | No | Yes | No | Yes | No | Yes |
| Adhesive strength of PSA1 (N/10 mm) | Without lubricant | 2.660 | 2.327 | 2.113 | 3.929 | 4.346 | 4.439 | 4.294 |
|  | With water-based lubricant | 1.168 | 1.899 | 2.352 | 1.169 | 2.198 | 1.812 | 3.474 |
|  | With emulsion-based lubricant | 2.506 | 2.736 | 2.624 | 3.483 | 3.616 | 3.160 | 3.402 |
| Adhesive strength of PSA2 (N/10 mm) | Without lubricant | N/A | 3.636 | 3.886 | N/A | N/A | 6.103 | 4.358 |
|  | With water-based lubricant | N/A | 0.371 | 0.846 | N/A | N/A | 1.832 | 0.371 |

TABLE 2-continued

| | | | | | | | |
|---|---|---|---|---|---|---|---|
| With emulsion-based lubricant | N/A | 1.086 | 1.514 | N/A | N/A | 2.270 | 2.122 |

TABLE 3

| | Pressure-sensitive adhesive tape | | | | | | | | |
|---|---|---|---|---|---|---|---|---|---|
| | (1) | (2) | (3) | (4) | (5) | (6) | (7) | (8) | (9) |
| Type of backing layer | Crepe paper | Crepe paper | Crepe paper | Crepe paper | Washi paper | Washi paper | Washi paper | Washi paper | Crepe paper |
| Type of adhesive | Acrylic-based | Acrylic-based | Acrylic-based | Acrylic-based | Acrylic-based | Acrylic-based | Acrylic-based | Acrylic-based | Acrylic-based |
| Presence of primer layer | No | Yes | No | Yes | No | Yes | No | Yes | No |
| Anchoring strength of PSA1 (N/20 mm) | 20.969 | 19.801 | 17.306 | 19.026 | 22.705 | 22.875 | 16.979 | 18.583 | 20.177 |
| Anchoring strength of PSA2 (N/20 mm) | N/A | N/A | 17.977 | 18.035 | N/A | N/A | 18.861 | 17.708 | N/A |

| | Pressure-sensitive adhesive tape | | | | | | |
|---|---|---|---|---|---|---|---|
| | (10) | (11) | (12) | (13) | (14) | (15) | (16) |
| Type of backing layer | Crepe paper | Crepe paper | Crepe paper | Washi paper | Washi paper | Washi paper | Washi paper |
| Type of adhesive | Rubber-based | Rubber-based | Rubber-based | Rubber-based | Rubber-based | Rubber-based | Rubber-based |
| Presence of primer layer | Yes | No | Yes | No | Yes | No | Yes |
| Anchoring strength of PSA1 (N/20 mm) | 18.891 | 18.174 | 18.272 | 19.658 | 19.598 | 16.353 | 17.035 |
| Anchoring strength of PSA2 (N/20 mm) | N/A | 18.210 | 18.146 | N/A | N/A | 15.836 | 17.979 |

TABLE 4

| Pressure-sensitive adhesive tape | | | (3) | (4) | (8) | (16) |
|---|---|---|---|---|---|---|
| Type of backing layer | | | Crepe paper | Crepe paper | Washi paper | Washi |
| Type of adhesive | | | Acrylic-based | Acrylic-based | Acrylic-based | Rubber-based |
| Presence of primer layer | | | No | Yes | Yes | Yes |
| Shear strength (N/19 mm × 19 mm) | Without lubricant | 2 hr | 48.848 | 44.831 | 54.053 | 53.930 |
| | | 24 hr | 57.077 | 51.331 | 61.571 | 48.236 |
| | With water-based lubricant | 2 hr | 1.340 | 3.775 | 6.049 | 2.202 |
| | | 24 hr | 15.789 | 18.641 | 9.561 | 18.151 |
| | With emulsion-based lubricant | 2 hr | 1.826 | 8.679 | 4.089 | 0.508 |
| | | 24 hr | 2.529 | 5.439 | 8.151 | 2.060 |

The invention claimed is:

1. A pressure-sensitive adhesive tape comprising
a backing layer having a first and a second surface; and
a first pressure-sensitive adhesive layer affixed to the first surface;
a second pressure-sensitive adhesive layer affixed to the second surface;
wherein:
the first pressure-sensitive adhesive layer has an adhesive strength of 2.0 N/10 mm to 9.0 N/10 mm in absence of a solvent,
the second pressure-sensitive adhesive layer has an adhesive strength of 2.0 N/10 mm to 8.0 N/10 mm in absence of the solvent, and
when a 10 mm×80 mm area of the first pressure-sensitive adhesive layer is wetted by three drops of the solvent, the adhesive strength of the first pressure-sensitive adhesive layer has a difference of 1% to 20% from the adhesive strength of the first pressure-sensitive adhesive layer in the absence of the solvent, and when a 10 mm×80 mm area of the second pressure-sensitive adhesive layer is wetted by three drops of the solvent, the adhesive strength of the second pressure-sensitive adhesive layer has a difference of 1% to 20% from the adhesive strength of the second pressure-sensitive adhesive layer in the absence of the solvent, the solvent being a water-based solvent or an emulsion-based solvent; and
the pressure-sensitive adhesive tape has a tensile strength in longitudinal direction of 45 N/15 mm to 80 N/15 mm.

2. The pressure-sensitive adhesive tape according to claim 1, further comprising a primer layer sandwiched between the backing layer and the first pressure-sensitive adhesive layer.

3. The pressure-sensitive adhesive tape according to claim 2, wherein the primer layer comprises a polyolefin polymer, a polyolefin elastomer polymer, an acrylic polymer or any combination thereof.

4. The pressure-sensitive adhesive tape according to claim 2, wherein the pressure-sensitive adhesive tape has a shear adhesive strength of 23 N/19 mm×19 mm to 76 N/19 mm×19 mm in absence of a solvent.

5. The pressure-sensitive adhesive tape according to claim 1, further comprising a release liner affixed to the first pressure-sensitive adhesive layer or the second pressure-sensitive adhesive layer.

6. The pressure-sensitive adhesive tape according to claim 1, further comprising a primer layer sandwiched between the backing layer and the first pressure-sensitive adhesive layer; and
a release liner affixed to the first pressure-sensitive adhesive layer or the second pressure-sensitive adhesive layer.

7. The pressure-sensitive adhesive tape according to claim 6, wherein the primer layer comprises a polyolefin polymer, a polyolefin elastomer polymer, an acrylic polymer or any combination thereof.

8. The pressure-sensitive adhesive tape according to claim 1, wherein the backing layer comprises from 50% to 100% by weight of a paper material.

9. The pressure-sensitive adhesive tape according to claim 8, wherein the acrylic polymer comprises a monomer unit, 70% to 100% by weight of the monomer unit being derived from 2-ethylhexyl acrylate.

10. The pressure-sensitive adhesive tape according to claim 1, wherein the backing layer is impregnated with latex.

11. The pressure-sensitive adhesive tape according to claim 10, wherein the acrylic polymer comprises a monomer unit, 70% to 100% by weight of the monomer unit being derived from 2-ethylhexyl acrylate.

12. The pressure-sensitive adhesive tape according to claim 1, wherein the first pressure-sensitive adhesive layer comprises from 65% to 100% by weight of an acrylic polymer.

13. The pressure-sensitive adhesive tape according to claim 1, wherein the second pressure-sensitive adhesive layer comprises from 65% to 100% by weight of an acrylic polymer.

14. The pressure-sensitive adhesive tape according to claim 1, wherein the first pressure-sensitive adhesive layer has an adhesive strength of 2.0 N/10 mm to 5.0 N/10 mm in absence of a solvent.

15. The pressure-sensitive adhesive tape according to claim 1, wherein the first pressure-sensitive adhesive layer has an adhesive strength of 2.0 N/10 mm to 6.0 N/10 mm in absence of a solvent.

16. The pressure-sensitive adhesive tape according to claim 1, wherein the first pressure-sensitive adhesive layer has an adhesive strength of 2.0 N/10 mm to 7.0 N/10 mm in absence of a solvent.

17. The pressure-sensitive adhesive tape according to claim 1, wherein the first pressure-sensitive adhesive layer has an adhesive strength of 3.0 N/10 mm to 9.0 N/10 mm in absence of a solvent.

18. The pressure-sensitive adhesive tape according to claim 1, wherein the second pressure-sensitive adhesive layer has an adhesive strength of 2.0 N/10 mm to 7.0 N/10 mm in absence of a solvent.

19. The pressure-sensitive adhesive tape according to claim 1, wherein the second pressure-sensitive adhesive layer has an adhesive strength of 3.0 N/10 mm to 8.0 N/10 mm in absence of a solvent.

20. The pressure-sensitive adhesive tape according to claim 1, wherein the pressure-sensitive adhesive tape has an elongation ratio in longitudinal direction of 6%/15 mm to 20%/15 mm.

21. The pressure-sensitive adhesive tape according to claim 1, wherein the pressure-sensitive adhesive tape has an elongation ratio in longitudinal direction of 6%/15 mm to 14%/15 mm.

22. The pressure-sensitive adhesive tape according to claim 1, wherein the pressure-sensitive adhesive tape has an elongation ratio in longitudinal direction of 7%/15 mm to 15%/15 mm.

23. The pressure-sensitive adhesive tape according to claim 1, wherein the pressure-sensitive adhesive tape has a tensile strength in longitudinal direction of 50 N/15 mm to 70 N/15 mm.

24. The pressure-sensitive adhesive tape according to claim 1, wherein the backing layer has a tensile strength in longitudinal direction of from 40 N/15 mm to 65 N/15 mm.

25. The pressure-sensitive adhesive tape according to claim 1, wherein the backing layer has an elongation ratio in longitudinal direction of 5%/15 mm to 12%/15 mm.

26. The pressure-sensitive adhesive tape according to claim 1, wherein the first pressure-sensitive adhesive layer has an anchoring strength of 12.0 N/20 mm to 28.0 N/20 mm.

27. The pressure-sensitive adhesive tape according to claim 1, wherein the second pressure-sensitive adhesive layer has an anchoring strength of 11.0 N/20 mm to 23.0 N/20 mm.

28. The pressure-sensitive adhesive tape according to claim 1, wherein the pressure-sensitive adhesive tape has a shear adhesive strength of 23 N/19 mm×19 mm to 76 N/19 mm×19 mm in absence of a solvent.

* * * * *